(12) United States Patent
Bruder et al.

(10) Patent No.: US 9,730,512 B1
(45) Date of Patent: Aug. 15, 2017

(54) TABLE FRAME AND TABLE

(71) Applicant: Veyhl GmbH, Neuweiler (DE)

(72) Inventors: Wolfgang Bruder, Simmersfeld (DE); Arthur Oswald, Neubulach (DE)

(73) Assignee: Veyhl GmbH, Neuweiler (DE)

( * ) Notice: Subject to any disclaimer, the term of this patent is extended or adjusted under 35 U.S.C. 154(b) by 0 days.

(21) Appl. No.: 15/019,979

(22) Filed: Feb. 10, 2016

(51) Int. Cl.
*A47B 9/20* (2006.01)
*A47B 13/02* (2006.01)
*A47B 13/00* (2006.01)
*F16B 12/10* (2006.01)
*A47B 9/04* (2006.01)

(52) U.S. Cl.
CPC ............... *A47B 13/02* (2013.01); *A47B 9/04* (2013.01); *A47B 9/20* (2013.01); *A47B 13/003* (2013.01); *F16B 12/10* (2013.01)

(58) Field of Classification Search
CPC .... A47B 9/04; A47B 9/20; A47B 9/00; A47B 2200/0051; A47B 57/30; F16M 11/26; F16M 11/18
USPC .... 108/147, 144.11, 144.19, 144.17, 147.19, 108/147.17; 248/188.2, 161, 188.4, 404
See application file for complete search history.

(56) References Cited

U.S. PATENT DOCUMENTS

| | | | | |
|---|---|---|---|---|
| 4,515,087 A | * | 5/1985 | Kurrasch | A47B 9/00 108/147 |
| 4,714,025 A | * | 12/1987 | Wallin | A47B 9/00 108/147 |
| 5,370,063 A | * | 12/1994 | Childers | A47B 9/06 108/143 |
| 5,394,809 A | * | 3/1995 | Feldpausch | A47B 9/00 108/147.21 |
| 5,400,721 A | * | 3/1995 | Greene | A47B 9/02 108/147 |
| 5,598,789 A | * | 2/1997 | Jonker | A47B 9/12 108/147 |
| 5,682,825 A | * | 11/1997 | Manner | A47B 9/02 108/144.11 |
| 6,062,148 A | * | 5/2000 | Hodge | A47B 9/12 108/147 |
| 6,119,605 A | * | 9/2000 | Agee | A47B 9/02 108/147 |
| 6,220,185 B1 | * | 4/2001 | Pontoppidan | A47B 9/02 108/147 |

(Continued)

FOREIGN PATENT DOCUMENTS

DE    20 2012 009 673    1/2013

*Primary Examiner* — Jose V Chen
(74) *Attorney, Agent, or Firm* — Paul Vincent

(57) ABSTRACT

A table frame for a table has a first column and a second column for supporting a table top, a cross member of hollow profile construction by which the first column and the second column are interconnected with each other and a first cantilever support mounted on the top end of the first column and a second cantilever support mounted on the top end of the second column. The first and the second column each have two projections at respective top ends thereof. The cross member, at each end section thereof, has a pair of oblong holes disposed on its lower side and through which the two projections of the respective column extend into the cross member. Each cantilever support has a first and a second flange which are arranged spaced-apart from one another, each of the flanges abutting the cross member on a lateral side portion thereof.

14 Claims, 6 Drawing Sheets

(56) References Cited

U.S. PATENT DOCUMENTS

| | | | | |
|---|---|---|---|---|
| 6,378,446 B1* | 4/2002 | Long | ............ | A47B 9/02 108/147 |
| 6,474,246 B2* | 11/2002 | Hsu | ............ | A47B 9/04 108/147 |
| 6,494,005 B2* | 12/2002 | Zimmerman | ............ | B66F 3/10 108/147 |
| 6,510,803 B1* | 1/2003 | Agee | ............ | A47B 9/00 108/147 |
| 8,104,410 B2* | 1/2012 | Lanfear | ............ | A47B 9/20 108/13 |
| 9,038,549 B1* | 5/2015 | Zebarjad | ............ | A47B 9/02 108/147 |
| 9,427,080 B2* | 8/2016 | Wu | ............ | A47B 3/002 |
| 9,486,069 B2* | 11/2016 | Widholzer | ............ | A47B 9/20 |
| 2011/0168064 A1* | 7/2011 | Jahnsen | ............ | A47B 9/00 108/147 |
| 2015/0096472 A1* | 4/2015 | Papic | ............ | A47B 9/20 108/28 |
| 2015/0108297 A1* | 4/2015 | Randlov | ............ | A47B 9/04 248/188.4 |
| 2016/0345722 A1* | 12/2016 | Chen | ............ | A47B 9/04 |
| 2016/0345724 A1* | 12/2016 | White | ............ | A47B 21/06 |

\* cited by examiner

TABLE FRAME AND TABLE

BACKGROUND OF THE INVENTION

The present invention relates to table frames and tables for both private and commercial use.

A table is a furniture with a table top forming a flat or essentially flat upper surface used to support objects, for storage, show, and/or manipulation. A common type of table is a desk, which is typically used to hold items that one would need to do work, such as papers, textbooks, or computers. The surface is usually supported from below by several vertical columns or "legs," which may be adjusted to set the table top of the workstation at a desired height. The legs are usually interconnected at their upper ends by a crossbeam for reason of stability.

The connection between the legs and the crossbeam or cross member is crucial for keeping the table top stable even under load. This is why the connection is usually of a rather complex construction and which may comprise many parts that have to be welded or screwed together. Further, as the tables or table frames are usually shipped as a kit disassembled into individual components to thereby reduce the space required as well as the transport costs, assembly of the table frames and tables in the field is, therefore, often rather tedious.

Thus, a need exists for a new design of table frames and tables for both private and commercial use that increases manufacturing efficiency and reduces installation time without jeopardizing the stability of the construction, and which can be easily packaged into a single box. The objective of the invention regarding the table frame is solved by a table frame according the independent claim. The table according to the invention comprises the features as given in the respective dependent claim.

SUMMARY OF THE INVENTION

The table frame according to the invention is suitable for private or commercial use and comprises a first column and a second column for supporting a table top. Each of the columns have a longitudinal axis, an upper end and a lower end. The table frame has a cross member of hollow profile construction by which the first column and the second column are interconnected with each other in the region of their upper ends, the cross member having a longitudinal extension. The cross member allows for a high margin of safety against overturning of the columns and a high grade of stability. The table frame further comprises a first cantilever support mounted on the upper end of the first column and a second cantilever support mounted on the upper end of the second column. Each of the cantilever supports is having two arms extending in an orthogonal direction with respect to the longitudinal extension of the cross member for support of the table top; thereby, table tops of various sizes may be mounted on the columns without the risk of tipping over. Also, thinner table tops with reduced stiffness may be used. The first and the second column are each having two projections at the respective upper ends thereof, the two projections of each column being arranged opposed to each other and spaced apart from one another, wherein the cross member, at each end section thereof, has a pair of oblong holes disposed on its lower side and through which the two projections of the respective column extend into the cross member. Each cantilever support has a first and a second flange which are arranged spaced apart from one another, each of the flanges abutting the cross member on a lateral side portion thereof, wherein the columns and the cantilever supports are detachably screwed together with the cross member by means of screws, each screw extending through a through-hole of one of the projections of one of the columns, a through-hole in the lateral side portion of the cross member at one end thereof, and a through-hole of the flanges of one of the cantilever supports. The table frame can be manufactured in a cost-efficient way, can be transported in a compact shipping box and can be easily and rapidly assembled.

According to a preferred embodiment of the invention, the columns, at each of their projections, have a tongue which extends away from the projection in an axial direction and which engages in a corresponding recess of an upper side of the cross member. This allows for an even greater stability of the connection of the columns and the cross member. Also, an unwanted disconnection of the columns and the cross member can thereby be prevented once the column has been inserted into the cross member. This further facilitates assembly of the table frame. Also, assembly of the table frame can thereby be made safer.

According to a further preferred embodiment of the invention, in each column, at the upper end thereof, an insert is seated, which forms screw-in threads for said screws. This reduces the overall number of parts required for assembly of the table frame. Further, the material thickness of the columns/projections can thereby be chosen more independently.

According to a yet further preferred embodiment of the invention, the insert is held in place inside the respective column by a pressed fit. Thereby, a time-consuming and costly screw connection is unnecessary. Also, the overall number of parts of the table frame can be kept low.

According to a further embodiment of the invention, the insert has lugs, which extend from the insert in a lateral direction, each of the lugs engaging in a recess provided in a front edges of one of the columns. This ensures a proper positioning and an easy mounting of the insert inside the respective column.

According to a further embodiment of the invention, the insert is made from cast metal or plastic to thereby reduce the manufacturing costs of the table frame.

According to a further embodiment of the invention, the projections of the columns each have an upper edge which is inclined to a longitudinal axis of the column at an angle which is different from 90°. This facilitates insertion of the projections into the oblong holes of the cross member of the table frame. The inclined edge thus serves as an insertion aid.

According to a further embodiment of the invention, the cantilever supports each have arms with an L-shaped cross section. The load-carrying capacity of the cantilever supports can thereby be greatly increased.

According to a further embodiment of the invention, the table frame is height-adjustable and wherein each of the columns comprises a telescopic lower and upper column section. In each of the columns, there can be disposed a spindle which is coupled with a motor which is disposed inside the cross member.

According to a further embodiment of the invention, the spindle engages in a bearing formed by an insert seated inside the upper end of the respective column. This ensures a durable and precise height adjustment of the table. The bearing may preferably comprise or be made out of a PTFE material to minimize friction between the bearing and the spindle. Alternatively, the bearing may be formed as a ball bearing. Such ball bearings are readily available on the market in different shapes and sizes and at an affordable price.

According to a further embodiment of the invention, the motor is mounted inside the cross member by means of a mounting rack. This further reduces manufacturing costs and allows for mounting of the motor in cross members of variable size.

According to a further embodiment of the invention, the mounting rack is held locked inside the cross member without screws. The number of parts as well as the manufacturing/assembly time required can thereby be further reduced.

Other features and advantages of the present invention will be apparent to a person skilled in the art from the following detailed description of an illustrated embodiment accompanied by the attached drawings wherein identical reference numerals will refer to like parts in the various use.

DESCRIPTION OF THE PREFERRED EMBODIMENT

Figure 1:
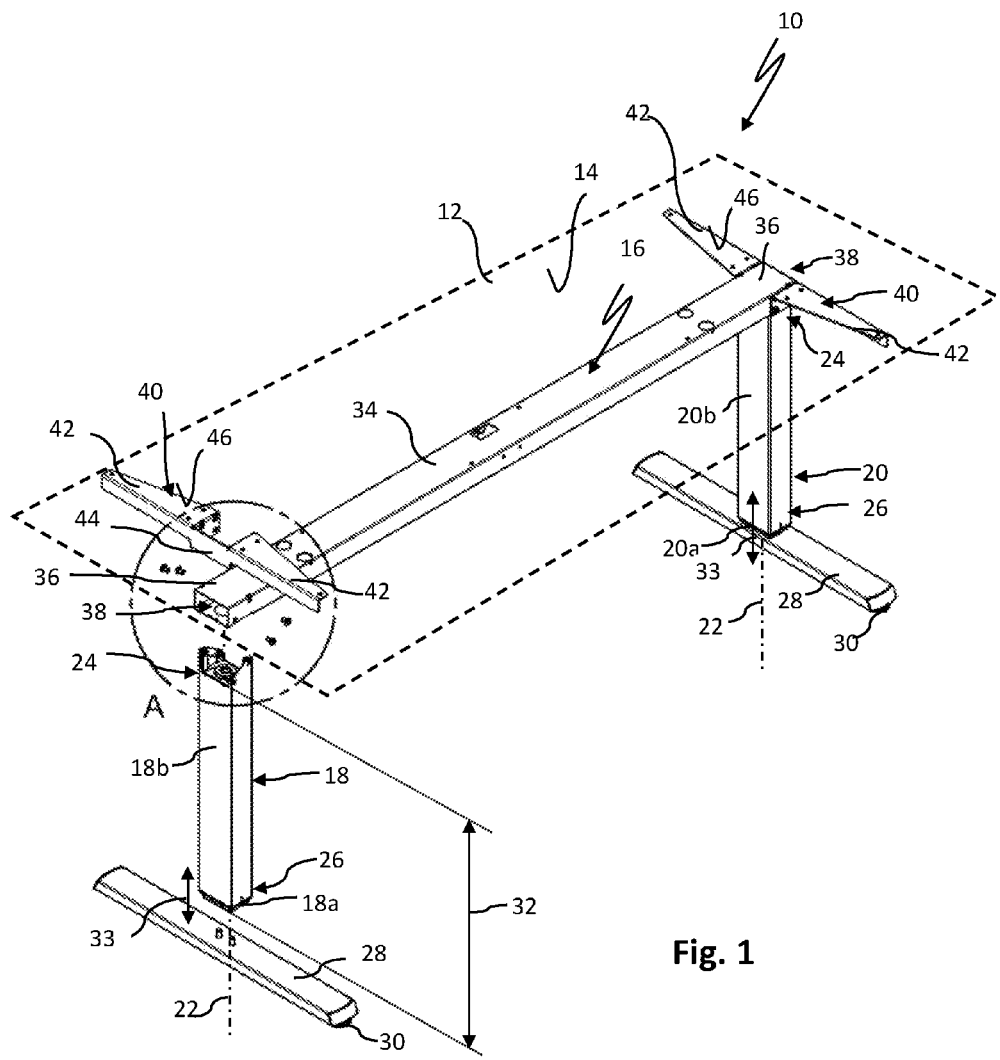
FIG. 1 is a perspective view of a table with a partially mounted table frame having a table top supported by two columns which, in the mounted state of the table frame, are interconnected by a longitudinal cross member.

FIG. 1 shows a perspective view of a partially mounted table 10 which may serve as an office desk, a workbench or the like. The table 10 comprises a table top 12 illustrated in a dashed line and forming a flat working surface 14. The table top 12 is mounted on and supported by a base or table frame 16. The table frame 16 comprises a first column 18 and a second column 20 which both serve as so-called legs of the table 10. A respective longitudinal axis of the columns 18, 20 is designated 22. The columns 18, 20 each have an upper end 24 and a lower end 26. Each column 18, 20 has a stabilizing foot part 28 attached to the lower end 26 thereof in the fully mounted state of table frame 16. The foot part 28 can be positioned on the lower end 26 of the columns 18, 20 such that the table frame 16 has the shape of a so-called T-frame as shown in FIG. 1 or, alternatively, as a so-called C-frame. Guides 30 or casters may be added to the foot part 28 to aid in leveling the table and increasing mobility thereof. Said columns 28, 20 may have a fixed length 32. It needs to be noted, however, that the length 32 of the columns may be adjustable as indicated by arrow 33 shown in FIG. 1. In the latter case, the columns 18, 20 are each designed as telescopic columns 18, 20 and feature at least two column segments 18a, 18b, 20a, 20b that can be moved relative to one another in an axial direction and which can be locked with respect to one another when the table 10, that is the table top 12, has been adjusted to a desired height.

The table frame 16 further comprises a longitudinal cross member 34 by which the columns 18, 20 are joined together in the region of their upper ends 24 when the table is fully assembled. The cross member 34 is of a hollow profile or tubular construction and has two end sections 36 with apertures 38.

The table top 12, in the fully assembled condition of the table 10, directly rests on at least a first and a second cantilever support 40 each of which is mounted to the upper end 24 of one of the columns 18, 20. Each cantilever support 40 has two arms 42 extending in an orthogonal direction with respect to the longitudinal extension of the cross member 34. The arms 42 of each cantilever support 40 are interconnected by a middle section 44 which, in the mounted state of the table frame, closes off one of the apertures of the cross member 36.

According to the embodiment shown in FIG. 1, the table top 12 directly rests on an upper side (surface) 46 of both cantilever supports 40. The table top 12 may also directly contact and rest on the cross member 34. Further, the table top 12 is fixed to the cantilever supports 40 and/or the cross member 34 by means of screws or any other suitable fixing means not shown in FIG. 1.

Figure 2:
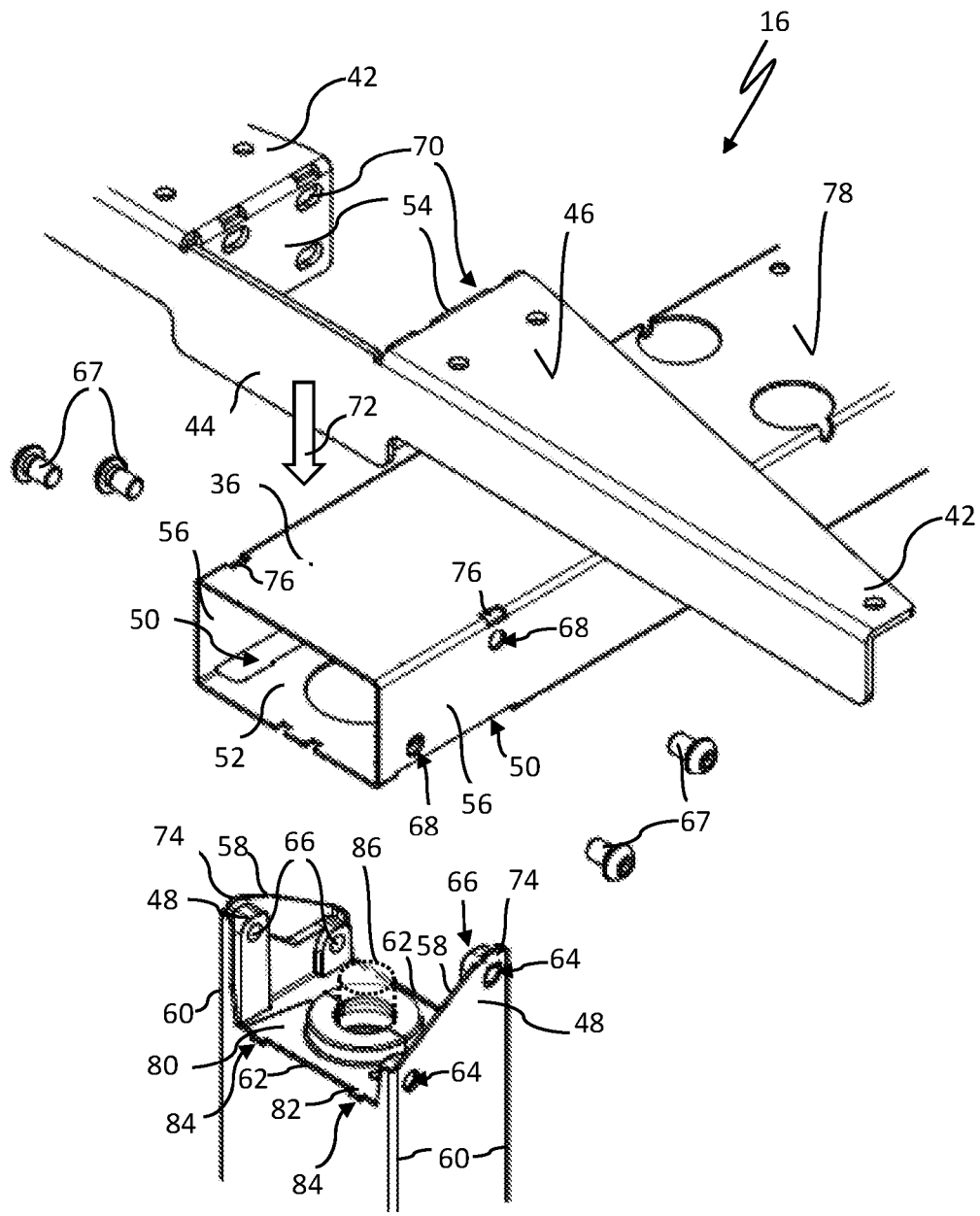
FIG. 2 is a detailed perspective view from above of the fixing area of the table frame designated as "A" in FIG. 1.
Figure 3:
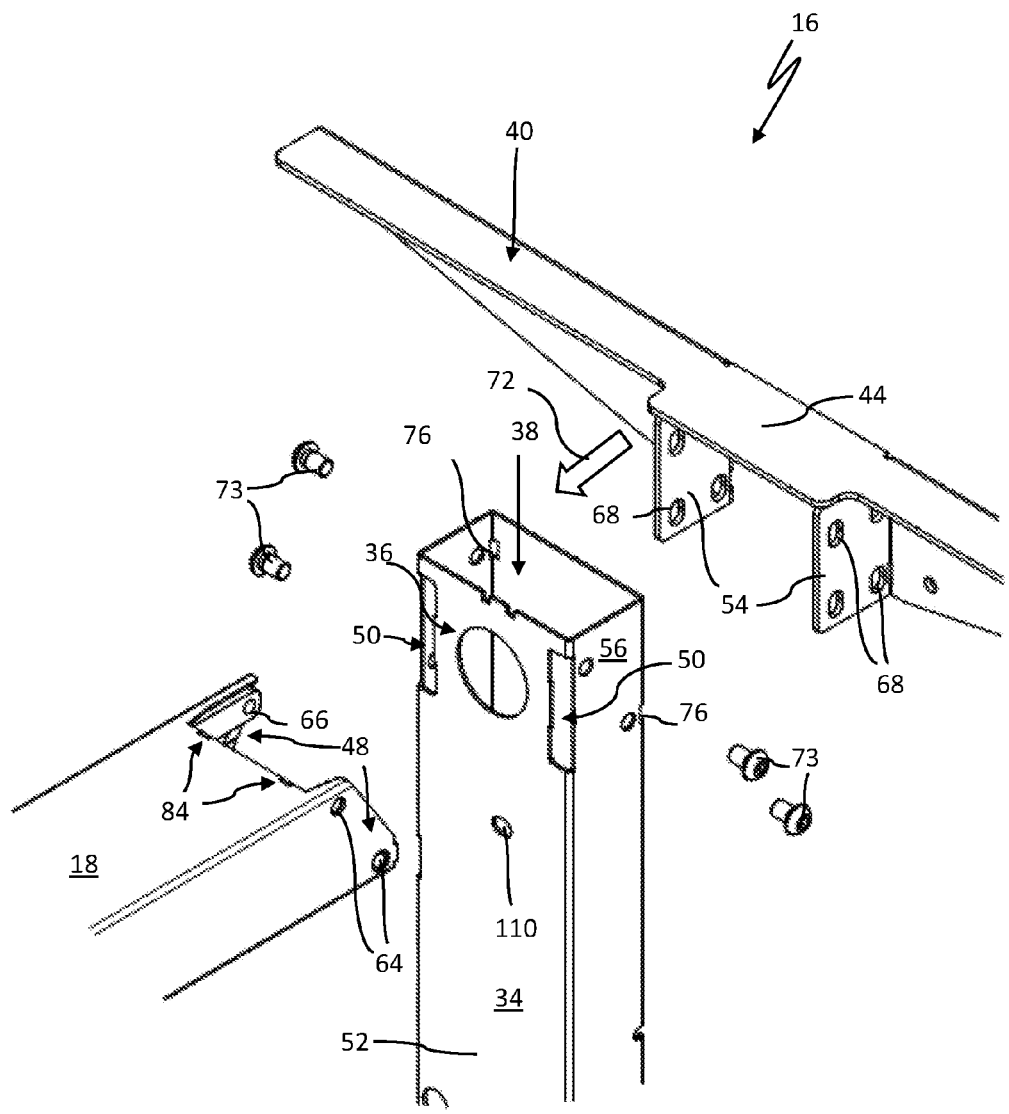
FIG. 3 is a detailed perspective view from below of the fixing area of the table frame designated as "A" in FIG. 1.

Reference is now made to FIGS. 2 and 3 which show a detailed partial view of the table frame 16 corresponding to the region designated "A" in FIG. 1. Each column 18, 20 has two axial projections 48 at the respective upper end 24 thereof. The two projections 48 are arranged opposed to each other and spaced apart from one another to thereby form a receptacle for accommodation of the cross member 34.

The cross member 34, at each end section thereof, has a pair of oblong holes 50 disposed on its lower side 52 and through which the two projections 48 of the respective column 18, 20 extend into the cross member 34 in the fully mounted condition of the table frame 16.

Each of the cantilever supports 40 of the table frame 16 has a first and a second mounting flange 54 which are arranged spaced apart from one another. The mounting flanges 54 are structured and designed to directly abut against cross member 34 on a lateral side portion 56 thereof as is shown in FIG. 1 with regards to the fully mounted second cantilever support 40 depicted on the right side. The arms 42 of the cantilever support 40 all have an L-shaped cross section for reasons of an improved load-bearing capability.

The two projections 48 of each column 18, 20 each have an upper (leading) edge 58 that is arranged inclined at an angle different from 90° with respect to side edges 60 of the respective column 18, 20 associated therewith. Interposed between the two projections 48 of each column 18, 20 are front edges 62, which are preferable arranged horizontally, that is orthogonally to said side edges 60 of the column 18, 20. By the inclined upper edges 58, the projections 48 of each column 18, 20 can be inserted (fed) into the corresponding oblong holes 50 of the cross member 34 with ease when assembling the table frame 16 or table 10, respectively.

The projections 48 of the columns 18, 20 of the table frame 16 each are provided with at least one first through-hole 64 and a screw-in thread 66 associated therewith for anchoring, that is screwing in, a screw 67 or the like as is exemplarily shown for the column 18 depicted in FIGS. 2 and 3.

The cross member 34, likewise, on both of its end sections, has at least one second through-hole 68 disposed in each of its opposing lateral side portions 36. Further, each mounting flange 54 of the cantilever supports 40 is provided with at least a third through hole 70. Each screw-in thread 66, one of the first through-holes 64 and one of the third through-holes 70 of the cantilever supports 40 are arranged such that they are aligned with each other when the respective column 18, 20, with its projections 48, is inserted into its predefined mounting position within the cross member 34 and the respective cantilever support 40 is positioned on the cross member 34 in its designated mounting position. The cantilever support may, for this, be slid onto the cross member 34 in the direction of arrow 72. Thereby, corresponding fixing screws 67 may be quickly and easily screwed into the respective screw-in thread 66 during assembly of the table frame 16 for detachably joining the aforesaid components of the table frame 16 together. Moreover, a reduced number of arts is required for the connection of the columns 18, 20 and the cantilever supports 40 with the cross member 34.

Figure 4:
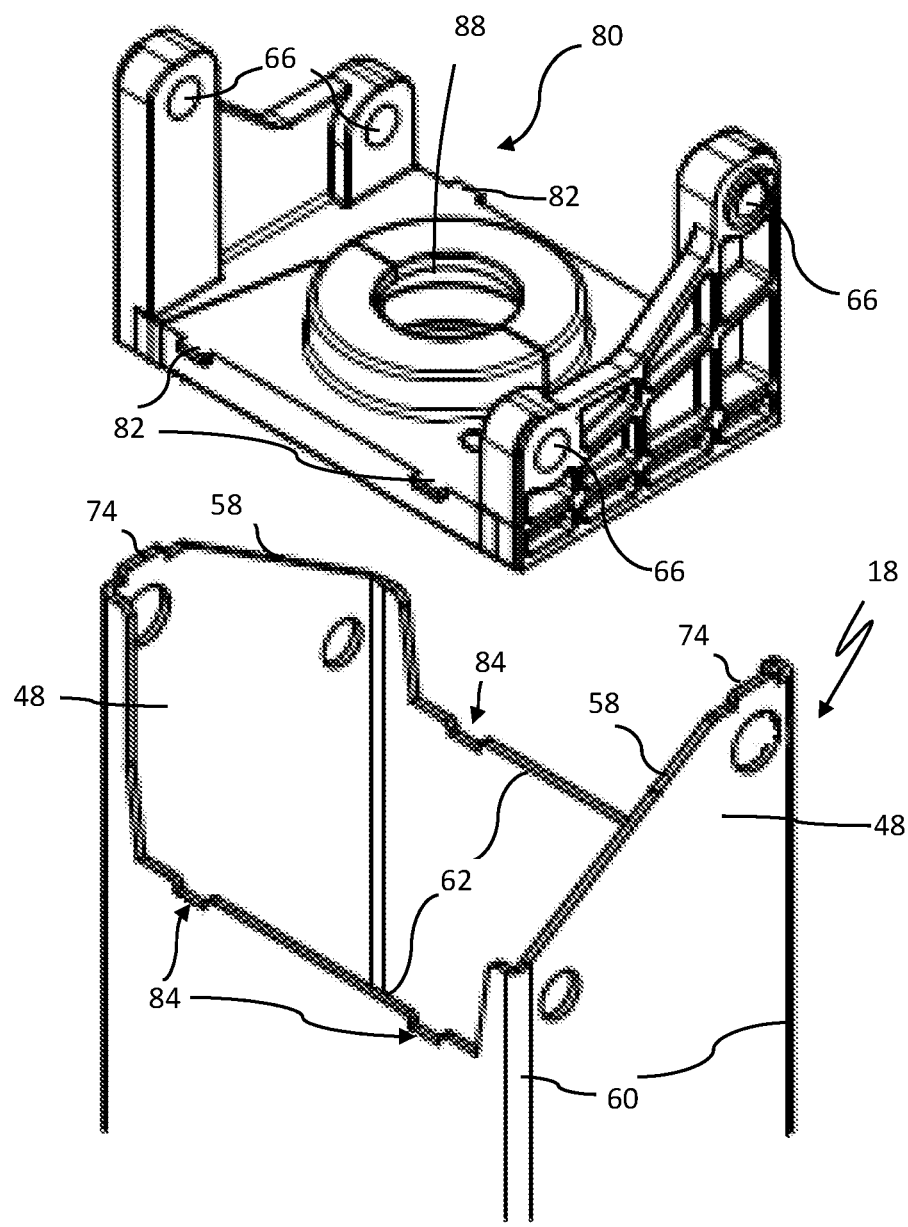
FIG. 4 is a perspective partial view of the vertical column of the table frame shown in FIG. 1.

Further, as can be seen in FIG. 4, each projection 48 of the columns 18, 20 may be provided with a profiled (axial) extension 74, in particular a tongue, which, in the assembled state of the table frame 16, engages in a corresponding recess 76 provided in the upper side 78 of the cross member 34 (FIGS. 2 and 3). The profiled extensions 74 and the corresponding recesses 76 of the respective column 18, 20 are designed/positioned such that the column 18, 20, with its projections 48, is held in a form-locking and, preferably additionally in a force-locking manner, within the cross member 34 once the profiled extensions 72 of the column 18, 20 have been inserted into the corresponding recess 74 of the cross member 34. The connection of the columns 18, 20 with the cross member 34 can thereby be realized free of play. Also, assembly of the table frame 16 can thereby be further simplified as an unwanted disengagement of the parts can be prevented even before the respective columns 18, 20, the crossbar and the cantilever supports 40 have been screwed together by said fixing screws 72 (FIGS. 2, 3).

Further, as can be seen in FIGS. 2 and 4, the screw-in threads 66 provided on the upper end 22 of each column 18, 20 can be formed by an insert 80, which is seated within the tubular column 18, 20. The insert 80 is shown in FIG. 4 in detail and can be made of metal or any suitable plastic material. Further, for manufacturing reasons, the insert 80 can be of a two-part design. Preferably, the insert, once it has been inserted into the column, is held in the column 18, 20 in a clamped manner. Other ways for securing the insert to the column 18, 20, such as welding, gluing, are conceivable. The insert 80 preferably has lateral lugs 82 which are provided for an e.g. press-fitted engagement in recesses 84 provided in the front edges 62 of the column 18, 20 and by which the insert 80 is safely held in a desired position.

The supporting columns 18, 20 contain a drive mechanism to render the table 10/table frame 16 height-adjustable. The drive mechanism may be a known mechanical drive such as a chain or spindle 84 as is shown in FIG. 2 in dotted lines. The spindle 84 is oriented vertically within the column 18. As is shown in FIG. 4, the inserts 80 each may form a bearing 86 to stabilize the upper end of spindle 86 within the column 18, 20. The lower end (not shown) of the spindle 84 may, for instance, be attached to the lower column segment 18a, 20a, with screws or any other suitable fixing means.

Figure 5:
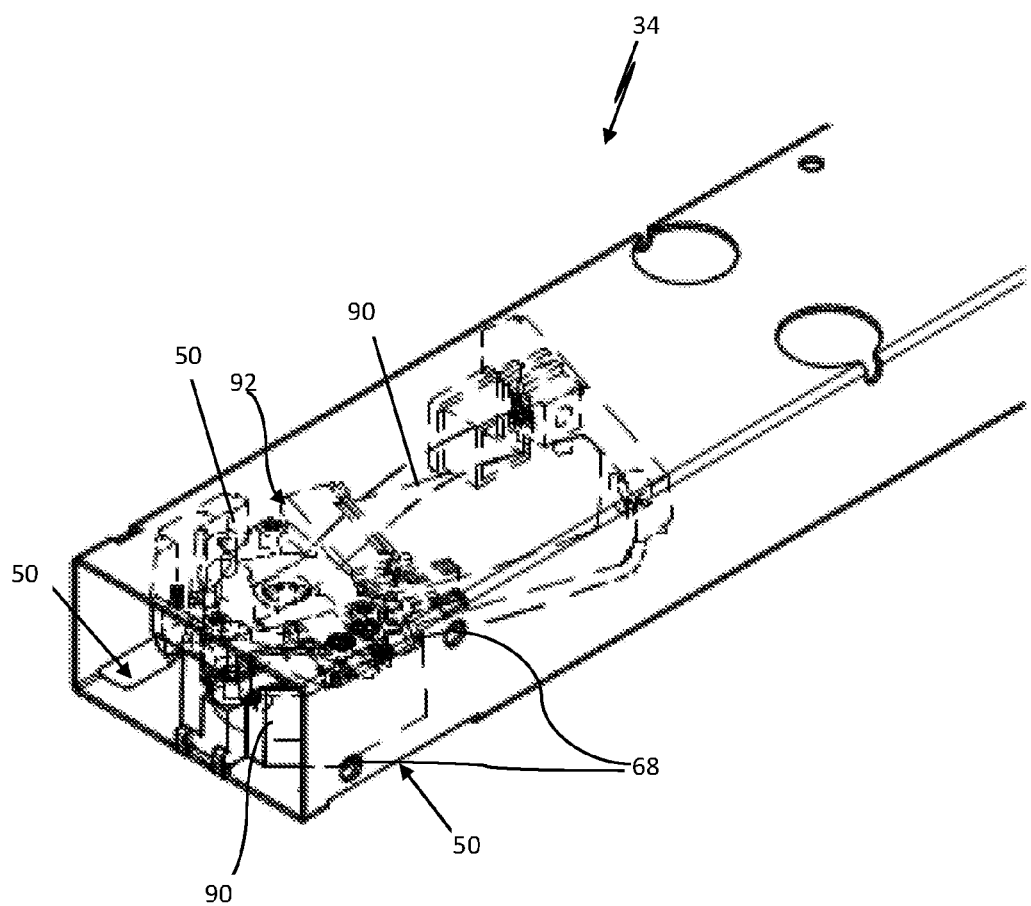
FIG. 5 is a perspective view of a cross member of a table similar to the table shown in FIG. 1, with an electric drive assembly mounted inside the cross member of the table frame according to FIG. 1.
Figure 6:
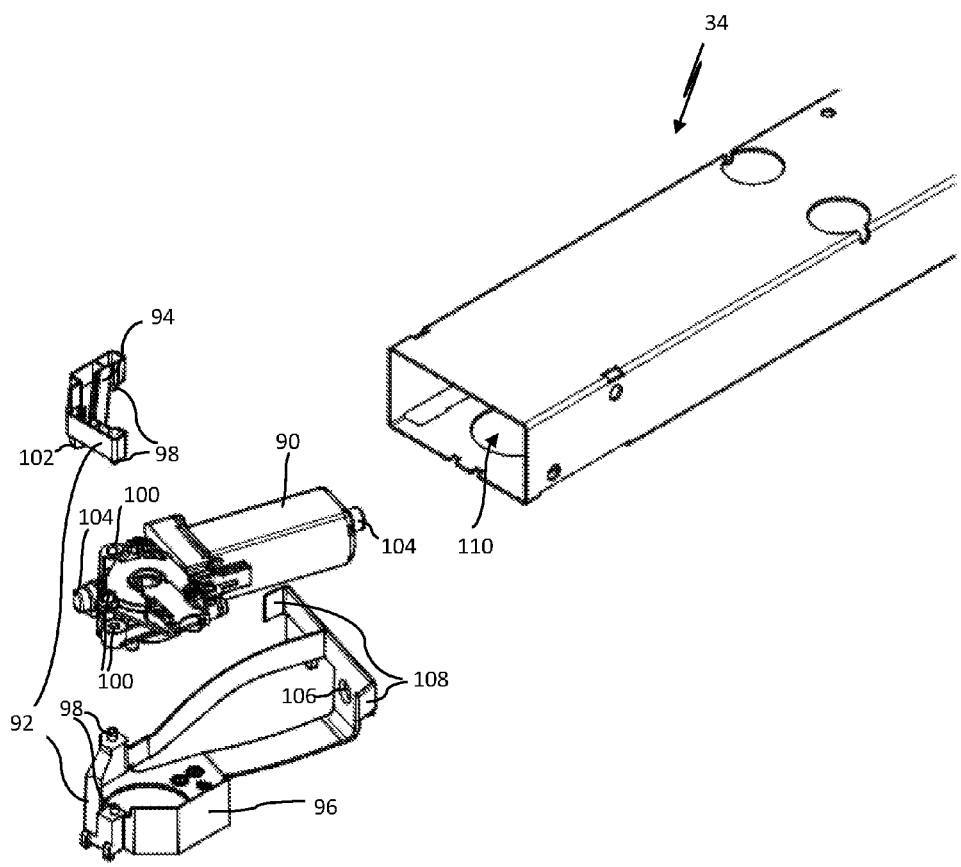
FIG. 6 is an exploded view of the longitudinal cross member and the electric drive assembly shown in FIG. 5.

According to a preferred embodiment of a height-adjustable table frame 16 shown in FIG. 5, at least one motor 90 may be mounted inside the tubular cross member 34. In a preferred embodiment, two motors 90 are mounted inside of the cross member 34. One motor 90 is placed at each end section 36 of the cross member 34. In the preferred embodiment, a mounting rack 92 comprising a top and a bottom motor attachment 94, 96 is used to stabilize the motor 90 within the cross member 34. The mounting rack 92 is shown in FIG. 6 in an exploded view of its parts.

The top motor attachment 94 is configured with two pins 98 that are inserted into two corresponding gear box holes 100 in the gearbox of the motor 90. The top motor attachment 94 also is configured with a drive shaft cup 102 that snaps over the front of the drive shaft 104 of the motor 90 when the top motor attachment 94 is attached to the motor 90. The bottom motor attachment 96 also is configured with two pins 98, which fit into the lower end of gear box holes 100. The bottom motor attachment 96 also is configured with a drive shaft hole 106 that fits over the rear end of the drive shaft 104 when the bottom motor attachment 96 is attached to the motor 90. The bottom motor attachment 96 also is configured with two guides 108 that serve to properly orient the motor 90 over the spindle hole 110 of the cross member 34 when the motor is inserted into the cross member 34. A spring loaded lock pin on the bottom motor attachment 96 secures the mounting rack 92 in the cross member 34 by pressing into the lock pin hole 112 of cross member 34 shown in FIG. 3 when the motor 90 is properly positioned in the cross member 34. Cross member 34 is provided with a spindle hole 110 for spindle 86 depicted in FIG. 3.

To assemble the table frame 16, the inserts 80 are first inserted into the columns 18, 20. Then the columns 18, 20 are inserted with their upper end projections into the respective oblong holes 50 of the cross member 34. In a following step, the cantilever supports 40 are each positioned so that the through-holes in the flanges 54 of the cantilever supports 40 are aligned with the corresponding through holes of the cross member 34 and the column screw holes corresponding therewith. A plurality of screws 73 are then inserted to attach the columns 18, 20 and table cantilever supports 40 to the cross member 34. The table top 12 and foot parts 28 are then connected to the assembled table frame 16 with, e.g. screws.

What is claimed is:

1. A table frame for a table, for private or commercial use, comprising:
   a first column and a second column for supporting a table top, each of the columns having a longitudinal axis, an upper end and a lower end;
   a cross member of hollow profile construction by which the first column and the second column are interconnected with each other in a region of their upper ends, the cross member having a longitudinal extension;
   a first cantilever support mounted on the upper end of the first column; and
   a second cantilever support mounted on the upper end of the second column;
   wherein each of the cantilever supports has two arms extending in an orthogonal direction with respect to the longitudinal extension of the cross member for support of the table top;
   wherein the first and the second column each have two projections at the respective upper ends thereof, the two projections of each column being arranged opposed to each other and spaced apart from one another,
   wherein the cross member, at each end section thereof, has a pair of oblong holes disposed on its lower side and through which the two projections of the respective column extend into the cross member,
   wherein each cantilever support has a first and a second flange which each extend downwardly and are arranged spaced apart from one another, each of the flanges abutting the cross member on opposite lateral sides thereof, wherein the columns and the cantilever supports are, detachably screwed together with the cross member by means of screws, each screw extending through a through-hole of one of the projections of one of the columns, a through-hole in the lateral side portion of the cross member at one end thereof, and a through-hole of the flanges of one of the cantilever supports.

2. Table frame according to claim 1, wherein the columns, at each of their projections, have a tongue which extends away from the projection in an axial direction and which engages in a corresponding recess of an upper side of the cross member.

3. Table frame according to claim 1, wherein in each column, at the upper end thereof, an insert is seated, said insert having threaded holes forming screw-in threads for said screws.

4. Table frame according to claim 3, wherein the insert is held in place by a pressed fit.

5. Table frame according to claim 3, wherein the insert has lugs, which extend from the insert in a lateral direction, each of the lugs engaging in a recess provided in a front edge of one of the columns.

6. Table frame according to claim 3, wherein the insert is made from cast metal or plastics.

7. Table frame according to claim 3, wherein the table frame is height-adjustable and wherein each of the columns comprises a telescopic lower and upper column section.

8. Table frame according to claim 7, wherein, in each of the columns there is disposed a spindle which is coupled with a motor which is disposed inside the cross member.

9. Table frame according to claim 8, wherein the motor is mounted inside the cross member by means of a mounting rack.

10. Table frame according to claim 9, wherein the cross member has a lock pin hole and the mounting rack has a spring loaded lock pin which secures the mounting rack in said lock pin hole.

11. Table frame according to claim 7, wherein a spindle is disposed in each column, said spindle engaging a bearing formed in an opening in said insert.

12. Table frame according to claim 1, wherein the projections each are provided with a top edge which is inclined to a longitudinal axis of the column at an angle which is different from 90°.

13. Table frame according to claim 1, wherein the cantilever supports each have arms with an L-shaped cross section.

14. A table comprising a table top mounted on a table frame according to claim 1.

* * * * *